July 22, 1941.  C. C. CRAM  2,250,360
COMBINATION BURNER CONTROLLER
Filed Aug. 3, 1938  5 Sheets-Sheet 1
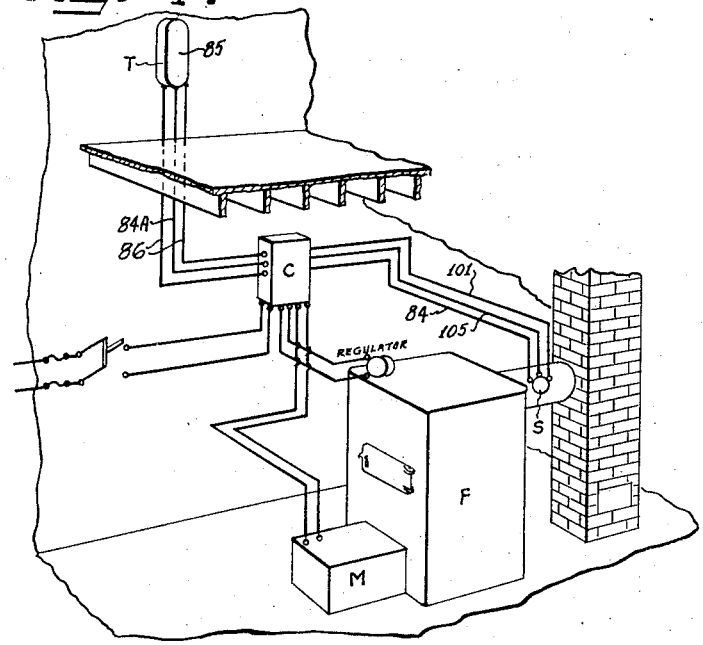
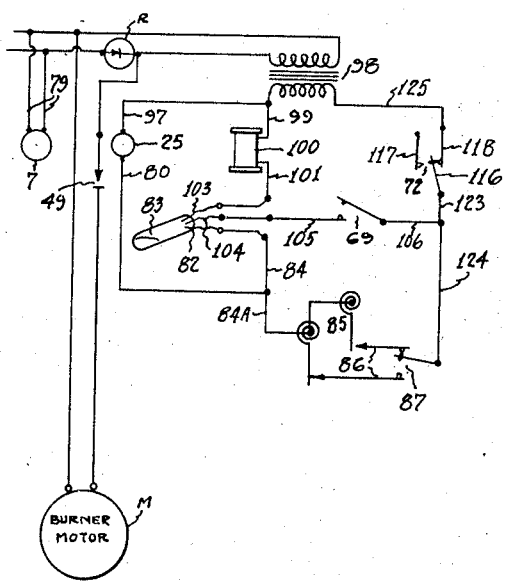
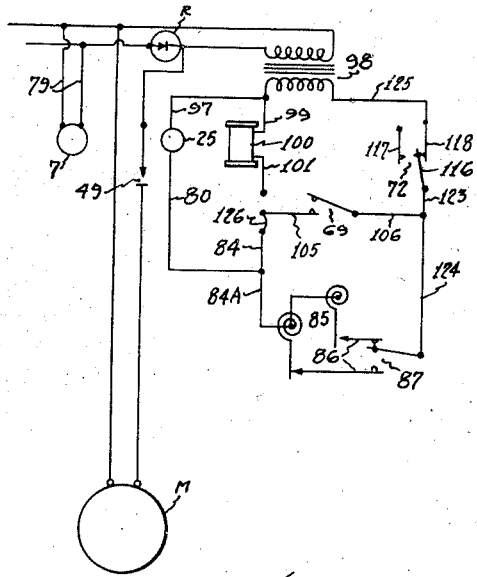
INVENTOR
CHARLES C. CRAM
BY
James L. Gurnan
ATTORNEY

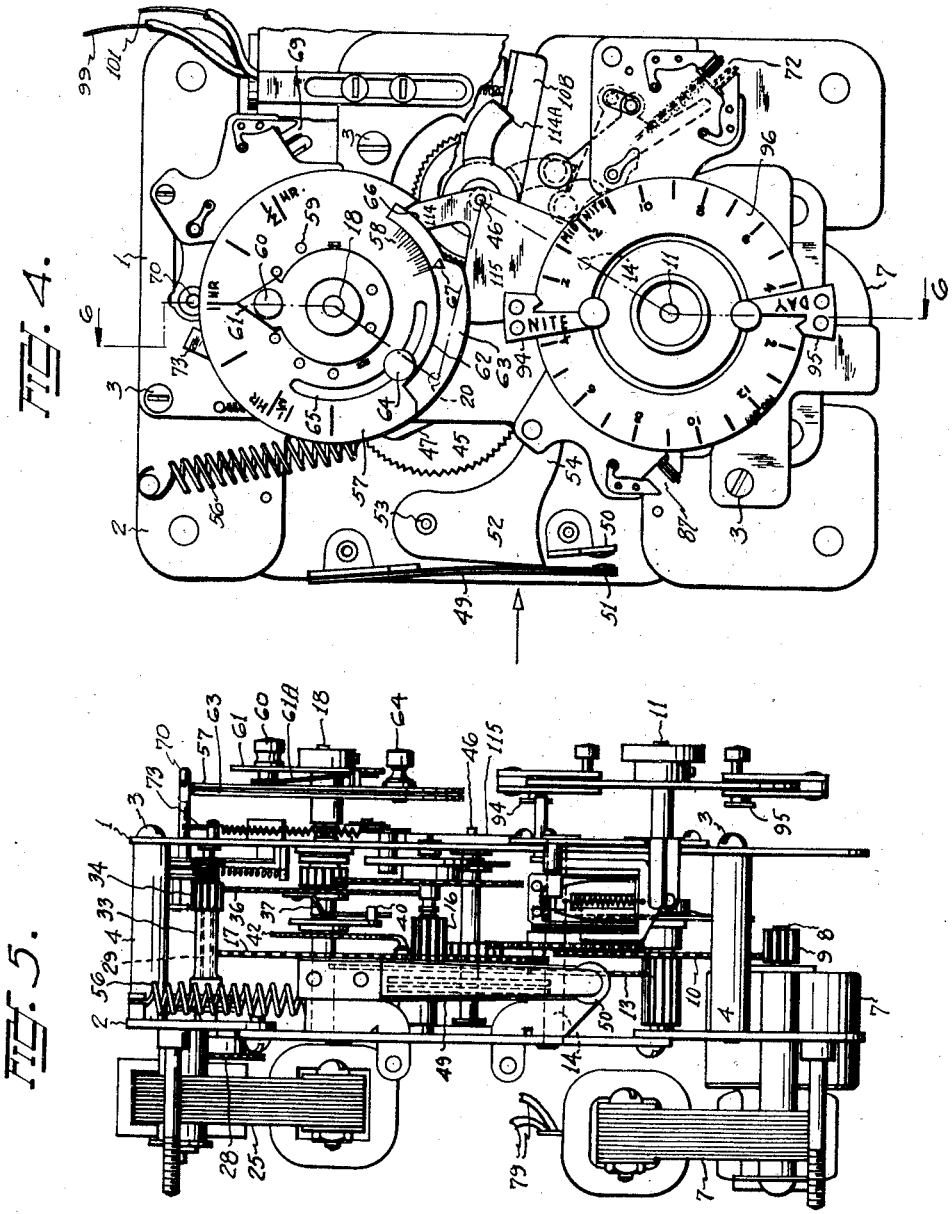

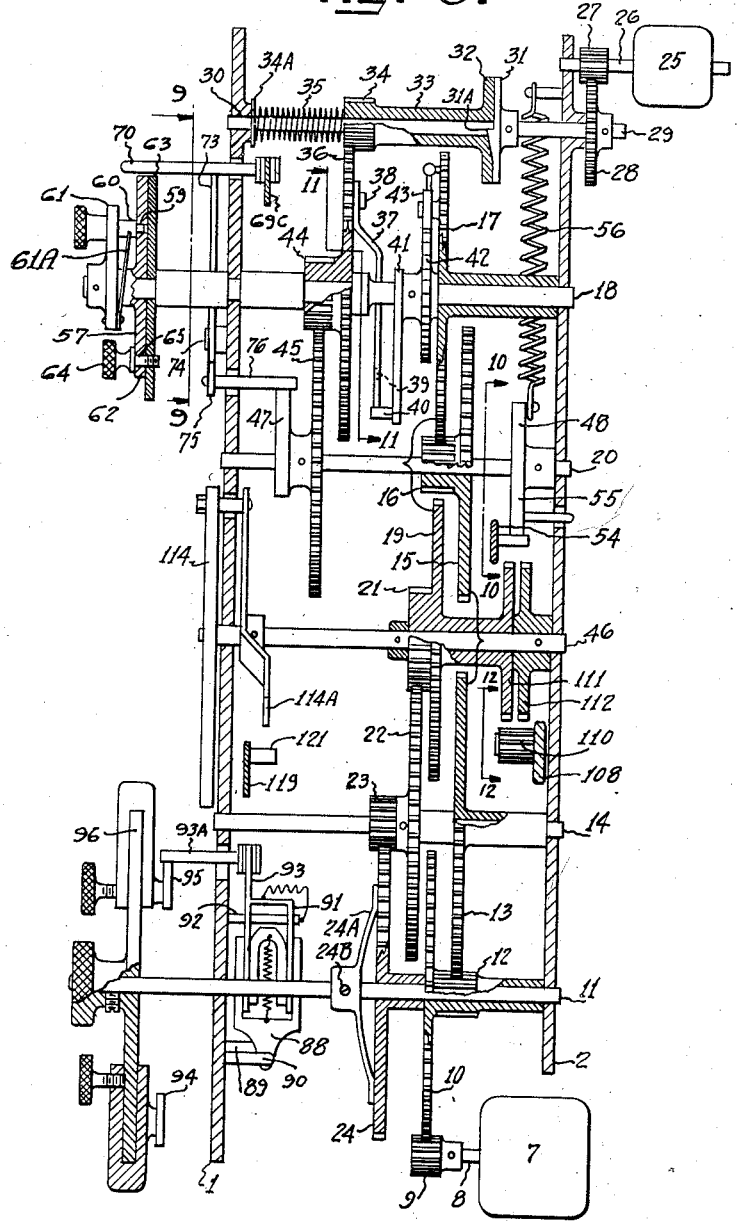

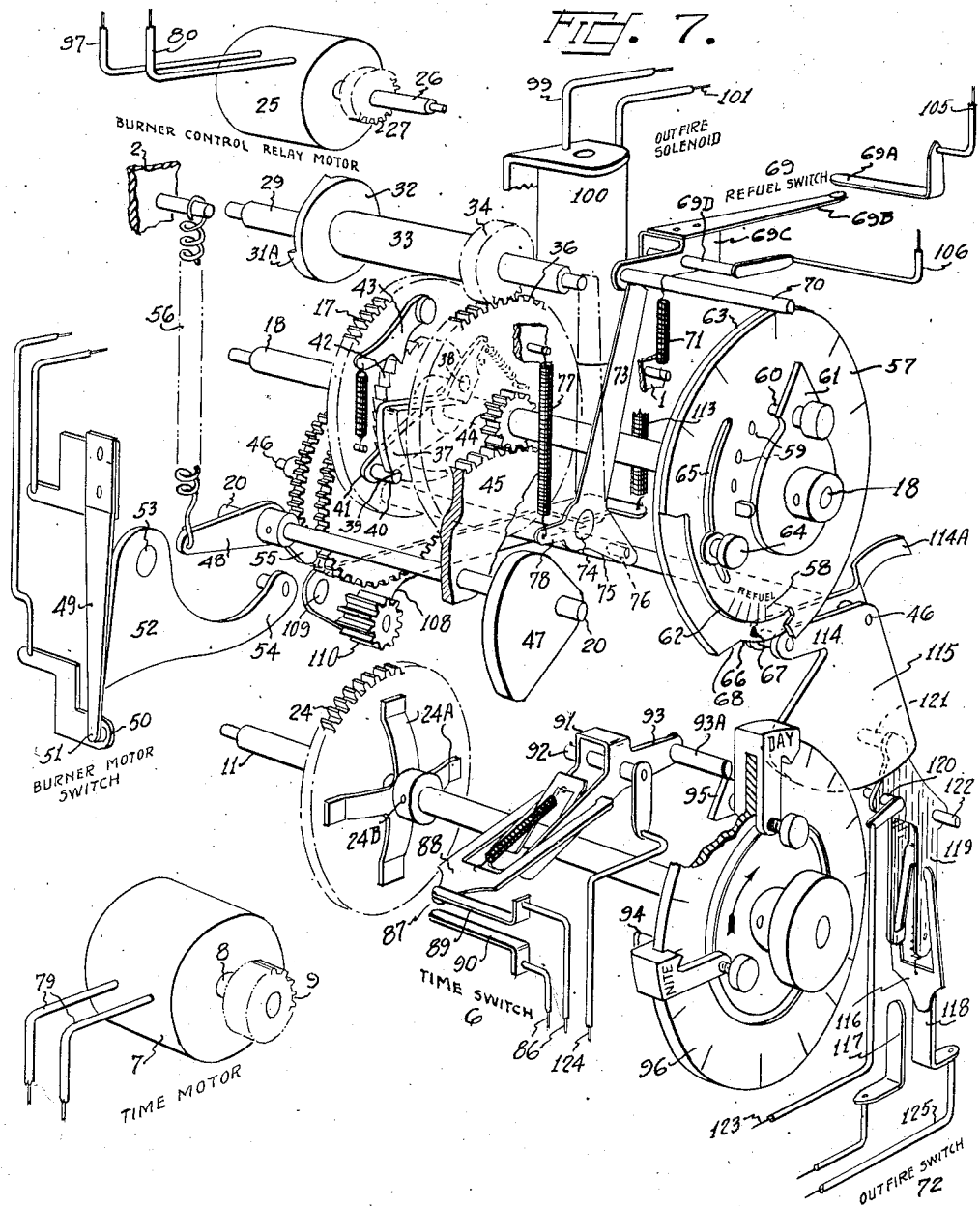

July 22, 1941.　　　　　C. C. CRAM　　　　　2,250,360
COMBINATION BURNER CONTROLLER
Filed Aug. 3, 1938　　　　5 Sheets-Sheet 5
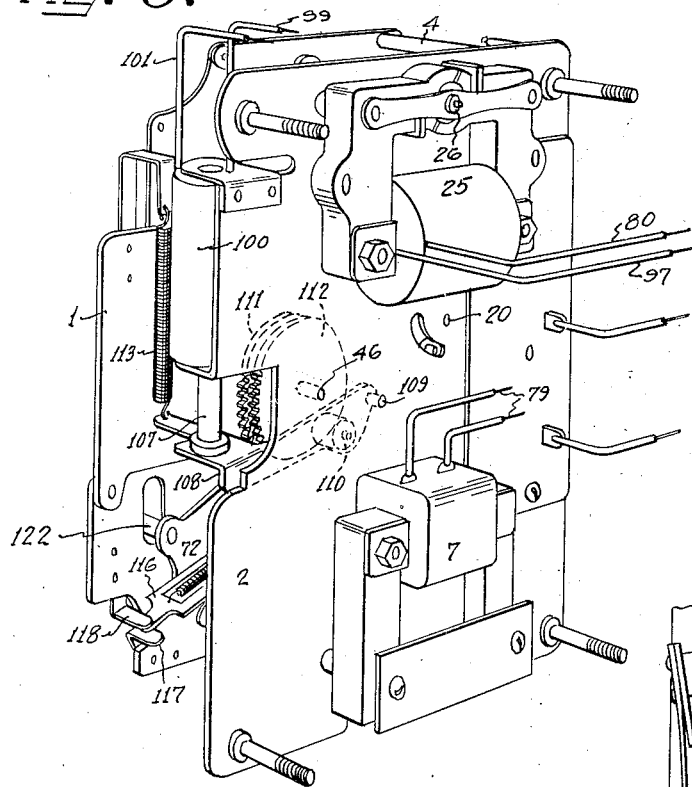
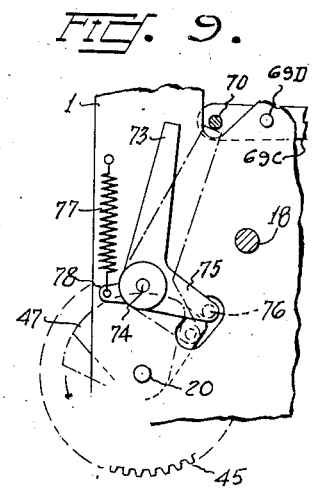
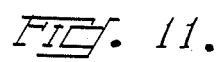
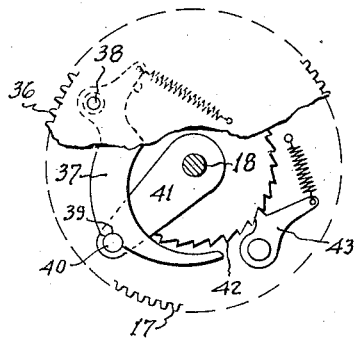
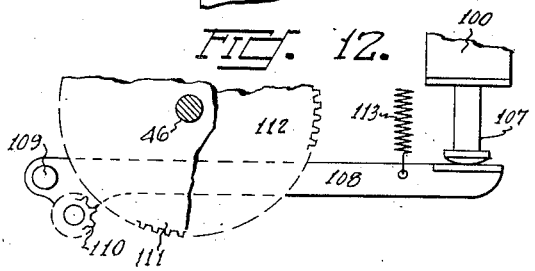
INVENTOR
CHARLES C. CRAM
BY
ATTORNEY Patented July 22, 1941

2,250,360

UNITED STATES PATENT OFFICE 2,250,360

COMBINATION BURNER CONTROLLER

Charles C. Cram, Portland, Oreg., assignor to L. R. Teeple Company, Portland, Oreg.

Application August 3, 1938, Serial No. 222,812

9 Claims. (Cl. 236—9)

This invention relates to improvements in a burner control device combining in a single unit: (1) a burner control relay for low voltage control; (2) a time switch for day and night control; (3) a periodic refueling timer for maintenance of heating plant and fire condition; and (4) a thermostatically controlled outfire-timer for conclusive shutdown in the absence of fire.

The functions performed by this control are necessary or at least desirable, in the operation of all controllable burners. The recognized advantages gained through the use of low voltages of the order of 12 to 24 volts in the room thermostat circuit requires a relay interposed between thermostat and burner motor. To gain the economies obtainable from automatically reduced night temperatures requires a 24 hour time switch. A periodic timer is of great value in smoothing out room temperature variations, due to the maintenance of the heating plant in a more or less warmed condition, and is essential for maintenance of fire in coal burning appliances which are not normally equipped with igniting means. The outfire timer supervises burner operation and guards against feeding of fuel in the absence of fire. This timer measures a predetermined period of initial operation during which an indication of satisfactory combustion must be registered to permit further operation to occur. The outfire trial period varies greatly depending on the nature of the fuel burned, being of the order of ten minutes to one hour for the usual coal burner and two minutes or less for more inflammable and therefore more hazardous fuels such as oil, gas and pulverized coal.

It will readily be understood that this control device may be adapted for use with any type of fuel by selecting suitable gearing to provide the correct time cycles for periodic and outfire timers. Furthermore with any fuel the relay function may be omitted by eliminating the burner control switch, connecting the burner motor directly in parallel with the relay motor (retained to perform its mechanical functions), supplanting the transformer source of reduced voltage with direct connections to the domestic service lines and designing all switches, coils and wiring to operate on normal domestic service potential.

For purposes of illustration I have chosen to confine my remarks to the device, including relay, as applied to coal burners and have selected timing intervals and cycles commonly employed therewith. For this application the periodic timer is referred to as a refueling timer.

The principal object of the invention is the provision in an instrument of this character of a choice of two types of refueling operation either with or without outfire protection, obtainable by simple adjustment and the provision or omission of a stack switch. As normally applied the device described requires a combustion responsive device, preferably a remotely located stack switch, to pilot the operation of the outfire timer. The stack switch used for illustration is electrically connected but obviously a mechanically connected temperature element could be substituted, in which case the outfire control solenoid could be eliminated and the outfire timer clutch and refuel switch stop arm adapted for mechanical energization by the element. The notch in the refueling dial is then set wide and the stack switch used to terminate the refueling operations directly from fire response, in addition to its outfire function obtained from control of the solenoid. This type operation, employing the stack switch and wide setting of the refueling notch, provides time-initiated, temperature-limited refueling operation with outfire protection during either refueling or heating operation.

The alternate method of refueling is obtained without using the stack-switch. When the stack switch is omitted the outfire timer is not operative and refueling is time-initiated and time-limited, that is, of fixed time-duration, obtained by simply reducing the width of the refueling notch to terminate as well as begin the refueling operation.

However, should price consideration coupled with an apparent lack of need for outfire protection cause this device to be installed without the stack switch, that instrument can readily be added if later experience shows the need for either outfire protection or temperature-limited refueling. Or, in case these features have been provided and vagaries of stack temperature, sometimes caused by conditions of the heating plant or the fuel, result in faulty operation, control from the stack can be eliminated and refueling based strictly on time to correct the trouble. These alterations in method of control do not necessitate removing, replacing or making major changes in the control device, which is a decided commercial advantage and has never before been possible.

Combination of these two methods are also possible if the stack switch is used and are of value, especially when stack conditions are sufficiently reliable to direct the outfire timer solenoid but not to satisfy the more stringent requirements of brief refueling operation. For example, by using a restricted setting of the dial notch a time limit may be established after which, if fire response has not previously ended the operation, the stoker will be stopped. Or, if positive refueling of set duration is desired, even though excessive combustion may cause the stack switch to remain open, it is only necessary to use the restricted notch setting and connect together two of the three stack switch terminals. With either of these compromise methods the outfire timer remains effective during any heating operation, which continues to a conclusive shutdown if the fire is out, but this supervision is not effective during refueling operations.

Another important object of the invention is the combining of these various mechanical elements in a single unit which will permit utilizing a single time motor, gear-train, enclosure and other parts for several purposes rather than duplicating these parts in separate devices. This combination also permits mechanical interlocking of relay and refuel timer, the operations of which must be correlated.

A further object is the use of certain mechanisms and circuit relationships necessary or important to the accomplishment of the above objects.

The foregoing and other objects will appear as my invention is more fully hereinafter described in the following specification, illustrated in the accompanying drawings, and finally pointed out in the appended claims.

The burner control relay consists of a small motor, gear-train, switch actuator and switch. The mechanism is normally biased to open position. The motor drives against the bias to close the switch, after which it is stalled with current on to hold the switch closed. A one-way clutch in the gear-train serves as a strain release by permitting the motor, which has appreciable inertia, to revolve freely to a gradual stop after the mechanism has been biased to and stopped at open position.

The time switch consists of a timer motor, suitable reduction gearing driving a time dial, and a switch operated by riders or dogs on the dial.

The refueling timer consists primarily of a switch and a switch actuator, the latter being in the form of a notched dial driven at a speed of one revolution in about 2½ hours by a branch of the time switch gear-train. The notch is manually adjustable in width for selection of desired running time from 1 to 15 minutes, or may be opened to 45 minutes when a stack switch is used to terminate refueling operations. The dial driver includes a ratchet and pawl constituting one-way engagement to permit advancing the dial ahead of the time drive for resetting purposes.

The outfire timer consists of a switch, switch actuator, time drive and electrically operated solenoid-actuated clutch connecting the drive to the actuator. The switch is manually reset after tripping. The actuator is biased to a reset position spaced 40 minutes from operating position. The time drive is taken from a suitable branch of the time switch train.

In the drawings:

Figure 1 is an installation diagram, in perspective.

Figure 2 is a wiring diagram including the stack switch.

Figure 3 is a wiring diagram without the stack switch.

Figure 4 is a front elevation with cover removed.

Figure 5 is a side elevation of Figure 4.

Figure 6 is an extended sectional view taken along the broken line 6—6 in Figure 4.

Figure 7 is a general perspective view of the device with most of the gearing removed for simplicity of illustration.

Figure 8 is a general view of the rear of the device in perspective.

Figure 9 is a section in elevation of the refuel switch restraining mechanism taken along the line 9—9 in Figure 6.

Figure 10 is a section in elevation taken along line 10—10 in Figure 6 showing the burner motor switch and related parts.

Figure 11 is a section taken along line 11—11 in Figure 6 showing reset mechanism for the refueling timer.

Figure 12 is a fragmentary sectional view taken along the line 12—12 in Figure 6 showing the solenoid controlled mechanism to operate the outfire switch actuator.

Referring now more particularly to the drawings:

The diagram in Figure 1 illustrates an installation hook up of the burner control device with a heating system, wherein M indicates a fuel-motor; F a furnace; S a stack switch; C the burner control device, and T a thermostat remotely disposed from the heating unit.

The body of the instrument comprises a front plate 1 and a back plate 2 which are spaced apart and secured together by bolts 3 which pass through tubular spacer elements 4. The lower portion of the body of the instrument embraces a time-switch, generally indicated at 6. A time-motor, generally indicated at 7, is mounted to the lower end of the back plate 2 in any approved manner and its shaft 8 extends through the plate and is provided at its end with a gear 9 which meshes with a gear 10 rotatably mounted on a shaft 11 which is mounted for manual rotation in the plates 1 and 2. Formed integral with, or secured to the gear 10, is a gear 12 in mesh with a gear 13. The gear 13 is rotatable on a shaft 14 mounted in the plates 1 and 2. The gear 13 meshes with a gear 15 formed integral with a gear 16 which meshes with a gear 17 rotatable with respect to a shaft 18 mounted through the plates 1 and 2. The gear 17 meshes with a gear 19 rotatably mounted on a shaft 46. A gear 21 is united with, or formed integral with, the gear 19 and meshes with a gear 22 mounted on, and secured to, the shaft 14. The gear 22 is formed integral with a gear 23 which meshes with a gear 24 mounted on and frictionally engaged with the shaft 11. The foregoing constitutes the main time gear-train and is in constant operation so long as the time-motor 7 is running.

At the upper end of the instrument, and secured to the back wall thereof, is a burner control relay motor, generally indicated at 25. The inner end of the motor shaft 26 (see Figure 6) terminates in a bearing in the plate 2 and is provided with a driving gear 27 (see Figure 6) in mesh at all times with a driven gear 28. The gear 28 is secured to one end of a shaft 29, which is journaled in a bearing in the plate 2, and its opposite end is journaled in a bearing 30 in the plate 1. The shaft 29 is provided with an overrunning clutch which consists of a disc 31 secured to and rotatable with the shaft 29, and a companion disc 32 which is secured to one end of a sleeve 33 which is at times freely rotatable upon the shaft 29. The opposite end of the sleeve terminates in a gear 34. A compression spring 35 is interposed between an abutment 34A on the shaft and the end of the sleeve to normally urge the disc 32 by means of the sleeve into operative engagement with the disc 31. When the discs are so engaged the motor 25 may then drive the sleeve 33, and the gear 34 formed on the end thereof in one direction by means of the operative engagement of the teeth 31A formed on the discs. The gear 34 is at all times in mesh with a gear 36 which is rotatable on the shaft 18. A latch 37 is pivoted, as at 38, to the back face of the gear 36 and is notched, as at 39, for engagement with a pin 40 carried by an arm 41 which functions at times as a part of the relay gear-train. The arm is secured to and made rotatable with a ratchet wheel 42 which is attached to shaft 18 and may be turned in an anti-clockwise direction, as viewed in Figure 7, but is held against rotation in a clockwise direction by means of a pawl 43 carried by the time train-gear 17 through which pawl motion of the time train is normally transmitted to shaft 18. Secured to or made integral with the gear 36 is a gear 44 which meshes at all times with a gear 45 which is secured to the shaft 20. The shaft 20 also rotatably carries the gears 15 and 16. Secured to the gear 45 and made rotatable therewith is a cam plate 47 whose function in connection with the refueling switch will be later described.

The foregoing constitutes the relay motor gear-train which is actuated by the relay motor as will be more fully hereinafter described.

Also secured to shaft 20 and rotatable therewith is an arm 48 (see Figure 10) for actuating the burner motor switch 49 which comprises a fixed contact 50 and a movable contact 51 at all times in contact with a cam 52 which is pivoted, as at 53, to the wall 2 of the instrument. The cam 52 is formed with an extension 54 terminating in the path of movement of cam face 55 of the arm 48. A spring 56 normally retains both cams in the positions shown in Figure 10 wherein cam 52 holds the burner switch open by separating contacts 50—51. As the shaft is rotated in the direction of the arrow cam face 55 moves away from the extension 54 of cam 52 leaving it free to move about its pivot point as the switch blade 51 moves under its spring tension back into contact with contact 50.

Rotation in the direction of the arrow is caused by energization of motor 25, opposed by spring 56 and restricted in extent by virtue of a pin projecting rearwardly from arm 48 through a slot in plate 2 to limit the travel of arm 48 and cam face 55. The arm is held in "switch closed" position by the stalled torque of motor 25. When motor 25 is subsequently de-energized arm 48 is moved in reverse (clockwise) direction under impetus of spring 56 to the normal "switch open" position. This motion imparts a reverse rotation to the relay gear-train which is transmitted through over-riding clutch teeth 31A to motor 25. Arm 48 is abruptly stopped as its pin reaches the other extremity of the slot in plate 2 but the appreciable momentum of motor 25 is free to be expended by virtue of the one-way engagement of the over-riding clutch, thus relieving the gear-train of undue strain.

Arranged on the front face of the instrument and loosely mounted on the shaft 18 is a refueling timer dial 57 provided on its face with one-hour graduations and fractions thereof, and also minute graduations 58. The dial is formed with a series of apertures 59 to selectively receive a pin 60 which extends through a pointer 61 which is secured to the shaft 18 by any suitable means. A leaf spring 61A is interposed between the pointer 61 and the pin 60 to normally urge the pin into any of the selected apertures 59. When the pin is engaged with an aperture the dial then becomes rotatable with shaft 18. The pointer 61 may thus be set in relation to any of the hour graduations on the dial which indicate the time required for the dial to rotate from the selected graduation around to a notch in the disc indicated at 62. Directly behind the disc 57 is a companion disc 63 which is rotatably mounted on the shaft 18 but settable with respect to the dial 57 and is adapted to be secured thereto by means of a set screw 64 which extends through an elongated slot 65 formed in the dial 57. The disc 63 is also notched, as at 66, so that a single notch of adjustable length may be obtained by relative movement of the discs 57 and 63. The graduations 58, it will be noted, extend from the leading face of the notch in the dial 57 (which revolves counter-clockwise) and a small pointer 67 is located at the trailing notch face 68 of disc 63 so that the time interval or spacing between these ends or faces of the two notches may be varied and the time value of the resulting notch indicated on scale 58.

The mechanism shown in Figure 11 constitutes a means of utilizing the reverse motion of the relay gear train, previously mentioned, to positively reset dial 57 to a predetermined position coincident with opening of burner switch 49. Latch 37, pivoted to a member of the relay gear-train, moves through an arc of slightly more than 360°. When burner switch 49 is being closed this motion is clockwise and latch 37 merely rides under pin 40, the position of which is unaffected due to its one-way engagement through ratchet wheel 42 with the relatively stationary member 17 of the slow moving time-train. An offset in the latch 37 (best shown in Fig. 6) permits unobstructed passage under pin 40. When burner switch 49 is being opened latch 37, now moving counter-clockwise, overhauls and commences to pass under pin 40 in the opposite direction until notch 39 engages the pin. Further motion of the latch is imparted to arm 41 and, therefore, to dial 57, the ratchet and pawl permitting movement in this direction with respect to gear 17. Therefore, the mechanism of Fig. 11 constitutes means of driving dial 57 in one direction at a slow rate from the time-train and of advancing the dial from any position to a predetermined position at a faster rate from the relay gear-train when the latter is moving in a selected direction.

At the upper end of the instrument is the refueling switch, generally indicated at 69, which is adapted to be actuated by a pin 70 arranged in wiping contact with the dial 57 and disc 63. This switch comprises a fixed contact 69A and a movable contact 69B carried by a bracket 69C which is pivoted to the wall 1 of the instrument, as at 69D. As the pin 70 is raised or lowered it opens or closes the contacts 69A—69B. As the dial 57 revolves under the pin 70 it maintains the refueling switch in an open position and accordingly prevents closing of the refueling switch 69 throughout a time interval as represented by the hour graduations on the dial, as aforesaid. However, when the dial rotates into a position to bring the notch 62 (or rather, the adjusted notch resulting from relative movements of the discs 57 and 63) beneath the pin 70 the pin will be drawn in the notch under the influence of the spring 71. This downward movement of the pin will then close the refueling switch to set the burner motor into refueling operation which will endure in one case for the time interval represented by the distance between the two ends or faces of the notch, as aforesaid. Or, on the other hand, if the notch in the disc 63 is swung around to register with the notch 62 and the two notches become as one, with a time equivalent of about forty-five minutes, then refueling operation will continue until refueling operation is stopped by the stack switch, whose function will be more fully hereinafter described, or in the event the stack switch does not respond, until outfire switch 72 opens and suspends further operation from any cause.

The burner motor switch is actuated by the functioning of the relay gear-train through rotation of the cam 55 on the shaft 20. As previously described, the gear 45 which drives shaft 20 also carries the cam 47 which is adapted, when the relay motor is deenergized, to actuate an arm 73 away from a biased position beneath the refueling switch pin 70 in which normally biased position the switch pin is prevented from dropping into the notch 66 as restricted or adjusted by notch 62. The arm 73 serves to withhold the refueling switch from operating if the relay motor is energized at a time when refueling operation would normally be initiated. The arm 73 is pivoted, as at 74, to the plate 1 and is formed with a leg 75 terminating in a pin 76 for engagement with the cam 47. As the cam is moved to the right, as viewed in Figure 9, the arm 73 will be retained in its full line position and out of contact with the pin 70. When the cam is moved to the left, the arm 73 and its leg 75 are drawn into the dotted line position by a spring 77 whose one end is secured to the plate 1, as shown, and whose opposite end is secured to a projection 78. In its dotted line position the arm is disposed beneath the pin 70 and prevents it from dropping into the dial notch, as aforesaid.

The time-motor 7, through its leads 79, is connected for continuous operation to any suitable source of current, preferably to the burner supply line.

The relay motor (see Figure 2) through one of its leads 80 is connected by wire 84 with one electrode 82 of a mercury switch 83. The lead 80 through branch wire 84A connects with a conventional room thermostat 85 and the thermostat by its leads 86 is connected with a time-switch or night-and-day time-actuated switch, indicated generally at 87. The time-switch, of snap-acting type, (see Figure 7) comprises a switch blade 88 working between two contacts 89 and 90. The contacts 89 and 90 are connected with two portions of the room thermostat 85 which represent zones of temperature for night and day operation. The switch blade 88 is actuated by a bracket 91 pivoted as at 92 and formed with an arm 93 provided with a pin 93A arranged in the path of movement of two pins or dogs 94 and 95 carried by a time-dial 96. Upon time-actuated rotation of the dial 96, the switch 87 is accordingly thrown from one setting to the other. The dial 96 is secured to the shaft 11 which continuously rotates through its frictional connection with the gear 24 of the time gear-train by means of the spring fingers 24A secured to shaft 11, as at 24B.

The other lead 97, of the relay motor 25, connects with a transformer 98 and also connects with one lead 99 of a solenoid 100. The opposite lead 101 of the solenoid connects with another electrode 103 of the mercury switch 83. The third electrode 104 of the mercury switch connects by wire 105 to one side of the refueling switch 69 for controlling the relay motor. The opposite side of switch 69 connects by wire 106 with wire 123 through outfire-switch 72 and thence by wire 125 back to transformer 98. Wire 106 from the refuel switch 69 also connects by wire 124 with the time switch 87.

The circuit shown in Figure 3, in which the stack switch 83 is eliminated, is identical with the diagram shown in Figure 2 except that wire 80 instead of connecting with stack switch by means of wire 84 is bridged across to wire 105 by wire 126. The mercury switch when used with the invention constitutes a part of any suitable combustion responsive device such as a stack-switch which is actuated by stack temperatures. The full line position of the mercury switch, as shown in Figure 2, indicates that the stack is hot, or in other words, that the fire is burning and the switch is open. Accordingly, the circuits from the thermostat 85 to the solenoid 100 and from the refueling switch 69 to the solenoid 100 and the relay motor 25 are open. With these circuits open and the solenoid 100 accordingly deenergized its core 107 (see Figure 12) is pressing downwardly by gravity against the outer end of an arm 108 pivoted, as at 109, to the instrument. The arm 108 rotatably carries a gear 110 which is adapted to be brought into mesh with gears 111 and 112 by a spring 113 when the solenoid is energized and its core is lifted from the outer end of the arm. The gear 110 is adapted to be taken out of mesh with the gears 111 and 112 by the weight of the core 107 pressing downwardly by gravity on the outer end of the arm 108 when the solenoid is deenergized. The gear 111 forms a branch of the time gear-train, being secured in spaced relationship to gear 19, which, as previously stated, is constantly in motion.

The gear 112, by means of the shaft 46, is attached to an outfire timing device adapted to throw out a main switch, generally indicated at 72, on the instrument after a predetermined period of timer operation to stop operation of the entire system. The outfire timer comprises an arm 114 provided with a biasing weighted portion 115. The arm 114 is swingable or rotatable with the shaft 46 to which the gear 112 is attached so that as the gear wheel 110 is brought into mesh with the gears 111 and 112 it will impart the rotary motion of gear 111 to gear 112 with a resultant swing of the weighted arm 114. As shown in Figure 7, the outfire switch 72 comprises a switch blade 116 movable between two contacts 117 and 118. This switch is of the snap-acting type and the blade 116 is actuated by an arm 119 pivoted as at 120 to one wall of the device. The arm extends upwardly, as shown, and carries a pin 121 arranged in the path of swing or movement of the cam face 114A of the arm 114B attached to and rotatable with the arm 114 so that as these arms swing a sufficient distance the cam face 114A will throw the outfire switch through the medium of the pin 121 swinging the arm 119. After being so operated the outfire switch 72 can be reset only through the agency of pin 122 which extends through front plate 1 and the mechanism cover (not shown) for manual operation.

Operation

Referring to Figure 2 and assuming that the burner has just been shut off the burner switch 49 will be open and the dial 57 reset with pointer 61 vertical under refuel switch pin 70. The dial assembly then slowly advances (counterclockwise) by virtue of its ratchet engagement with the time gear-train. After lapse of one hour (in this case), and barring a call for heat from the thermostat, leading face of dial notch 62 will reach pin 70 and the pin will drop into the notch, closing refuel switch 69. A circuit is thus established (see Figure 2) through refuel switch 69, wires 106 and 123, outfire switch contacts 116 and 118, wire 125, transformer secondary, wire 97, relay motor 25, wire 80, wire 84, stack switch electrodes 82 and 104, and wire 105 back to the refuel switch 69. Stack switch 83 will naturally be closed since the burner has been off for an hour and stack temperature will have been descending. The relay motor will be energized through this circuit and the burner switch 49 closed to renew the fire and warm the heating plant. At the same time a branch circuit through wire 99, solenoid 100, wire 101 and electrodes 103 and 104 will be established, energizing the solenoid which in turn permits pinion 110 to mesh with gears 111 and 112 and place outfire switch actuator 114A in motion, simultaneous with commencement of burner operation. Normally the operation of the burner will cause a rise in stack temperature which will, after a brief period, open switch 83, breaking both relay and solenoid circuits. Solenoid plunger 107 will then depress outer end of arm 108 retracting pinion 110 from engagement and allowing switch actuator 114A to return to rest position under impetus of weight 115. Breaking the relay circuit will allow main spring 56 to return the relay gear-train to rest position, thus opening burner switch 49, resetting dial 57 to starting position as determined by the setting of pointer 61 and in consequence thereof opening refuel switch 69.

In case the fire does not respond normally to burner operation the burner will continue to feed fuel and the outfire timer to approach switch actuating position. The dial 57 also continues to revolve but, by virtue of the wide setting of notch 66 the dial cannot open switch 69 until the outfire timer has completed its cycle. Consequently, should the fire fail to respond, outfire switch 72 will be tripped after its predetermined timing period has lapsed and all control circuits will be interrupted by opening of contacts 116 and 118, thus conclusively shutting down the burner until switch 72 is manually reset.

As switch 72 is tripped contact 116 comes into engagement with back contact 117 which may be connected to control a bell, lamp or other suitable signaling medium to warn the attendant of the condition which has arisen. This circuit, not shown, includes a suitable power source and is completed to contact 116.

Now assuming that stack switch 83 has been dispensed with, for cost or other reasons, wires 84 and 105 connected together and dial notch 66 narrowed to a desired number of minutes duration of refueling operation (see Figure 3). Now, in the absence of thermostat demand, refuel switch 69 will be closed as before at the expiration of the idle period set by pointer 61 and the relay circuit will follow the same path as before except that electrodes 82 and 104 of the stack switch are now supplanted by the jumper 126 across wires 84 and 105. The burner will again be turned on but the outfire timer will not function since solenoid lead 101 is not connected. After operation has continued for the period set on scale 58 trailing face of notch 66 will again open switch 69, deenergizing the relay and, as a result, resetting dial 57. Thus it can readily be seen with what ease the method of refueling may be altered from the temperature-limited method, which allows longer or shorter periods of operation depending upon condition and response of the fire, to the fixed-time method which gauges duration of refueling operations without regard for the vagaries of the fire.

Turning now to a normal heating operation initiated by the room thermostat and again referring to Figure 2 in which the stack switch 83 is employed. Assume that room temperature falls below the desired level and thermostat 85 (whichever portion is in control as determined by position of time switch 87) closes. The relay is energized through thermostat 85, switch 87, wire 124, wire 123, outfire switch contacts 116 and 118, wire 125, transformer 98, wire 97, relay motor 25, wire 80, wire 84A and back to the thermostat 85, closing burner switch 49. Parallel circuit through wire 99, solenoid 100, wire 101, electrodes 103 and 82, wire 84 and wire 84A is also established causing the outfire timer to commence functioning. Normally this parallel circuit will be opened by opening of switch 83 in response to rise of stack temperature and the timer will return to rest position, but the relay circuit will continue closed and the burner will operate until heat requirements in the room are satisfied assuming that the limit regulator R does not open. However, should the fire fail to respond stack switch 83 will remain closed and the outfire timer will continue through its 40 minute cycle, and finally terminate all further operation by tripping the outfire switch 72. Turning once more to Figure 3 it will be seen that the circuit employed to energize the relay in a normal heating operation remains unchanged if the stack switch is omitted but that the parallel circuit through which the outfire solenoid is energized and controlled is not completed and, therefore, that outfire protection is not provided.

An additional circuit of value under certain conditions may be set up by connecting the stack switch as in Figure 2 and adding a jumper across wires 84 and 105. Circuit relationships thus provided, accompanied by a restricted setting of notch 66, will result in fixed-time method of refueling, with the added advantage of outfire supervision during heating operations. Though this arrangement provides no outfire supervision during refueling operations, the quantity of fuel fed during these periods is so small that undue accumulation will not occur in the absence of fire before a subsequent heating operation causes the outfire switch to be tripped or until the absence of fire is noticed and corrected.

During any of the above outlined operations the refuel dial 57 continues to revolve and during a heating operation particularly may carry its notched portion 66 under refuel switch pin 70. It would be undesirable to allow refuel switch 69 to close under these conditions, nor is such closure needed, since the burner is already operating and will presumably operate for a longer period than required merely for renewing the fire. To prevent switch 69 from closing and taking control away from the thermostat even momentarily during a heating operation, arm 73 has been provided which, as previously explained, will be positioned beneath the pin 70 when the relay is energized in advance of the entrance of pin 70 into notch 66. However, should pin 70 enter notch 66 when the relay is deenergized, as it does to initiate a refueling operation, arm 73 when subsequently freed by cam 47, will be moved to the right (see Figure 9) under the urge of spring 77 until it bears against the side of pin 70 without altering the position or operability of the refueling switch.

Having thus described my invention, what I claim as new and desire to protect by Letters Patent is:

1. In combination, a burner control relay within an electric circuit to a power source, a thermostat in circuit with and controlling said relay, a time actuated switch mechanism including a switch in parallel circuit with said thermostat, interlocking means associated with said switch mechanism and said relay and adapted to reset said switching mechanism upon deenergization of said relay, a combustion responsive thermostat, a second time actuated switching mechanism independent of said first time actuated switching mechanism and including a switch adapted to interrupt said power source, controllable release means whereby said second mechanism may be reset to initial position, and circuit relationships embracing said combustion responsive thermostat and said release means whereby said release means is inoperative during any energization of said relay accompanied by a selected condition of combustion.

2. In combination, a burner control relay within an electric circuit to a power source, a thermostat in circuit with and controlling said relay, a time actuated switch mechanism including a switch in parallel circuit with said thermostat, interlocking means associated with said switch mechanism and said relay and adapted to reset said switching mechanism upon deenergization of said relay, a combustion responsive thermostat, a second time actuated switching mechanism independent of said first time actuated switching mechanism and including a switch adapted to interrupt said power source, controllable release means whereby said second mechanism may be reset to initial position, and circuit relationships embracing said combustion responsive thermostat and said release means whereby said release means is inoperative during any energization of said relay accompanied by a selected condition of combustion, and additional circuit relationships selectively embracing said combustion responsive thermostat and said first switch in a manner that completion of said parallel circuit across said thermostat will be dependent upon coaction of said combustion responsive thermostat and said first switch.

3. In combination, a relay, a thermostat in circuit with and controlling said relay, a combustion responsive switch, a time actuated switching mechanism including a switch, said last mentioned switch and said combustion responsive switch being mutually in series and jointly in parallel with said thermostat, a second time actuated switching mechanism, controllable release means whereby said second mechanism may be reset to initial position, and circuit relationships embracing said combustion responsive switch and said release means whereby said second mechanism will be released except during energization of said relay accompanied by a selected condition of combustion, and interlocking means associated with said first switching mechanism and said relay and adapted to reset said first switching mechanism upon deenergization of said relay.

4. Circuit relationships comprising, in combination, a relay, a control switch and an outfire switch operatively in series with said relay, a time actuated switch and a combustion responsive switch in series with each other and with said relay and said safety switch, and jointly in parallel with said control switch, and controllable resetting means adapted to be placed in parallel relationship with said relay by said combustion responsive switch through either said control switch or said time actuated switch and thereby adapted to be energized whenever said relay is energized and said combustion responsive switch is in a selected position and interlocking means associated with said relay and said time-actuated switch and adapted to reset said time actuated switch upon deenergization of said relay.

5. In a temperature control circuit of the type comprising an electrically actuated relay in series relationship with a control switch and with a time switch, said switches being in parallel with respect to each other, additional electrically actuated control mechanism adapted to be placed in parallel with said relay, and a thermal responsive switch in said time switch branch of said circuit, said thermal responsive switch having additional contact means for placing said additional mechanism directly in parallel with said relay when said thermal responsive switch is in a given position, and an actuator for said time switch interlocked with said relay whereby said actuator will be reset at the close of each relay operation.

6. In combination, a burner control relay within an electric circuit to a power source, a thermostat in circuit with and controlling said relay, a time-actuated switching mechanism including a switch in circuit with and controlling said relay, interlocking means associated with the actuator for said switch and the operator for said relay and adapted to reset said actuator at the close of each relay operation, a controllable second time-actuated switching mechanism disposed through circuit relationships to be operable only during energization of said relay and including a safety switch in circuit with and adapted to control said relay, a predetermined period of operation of said second time-actuated mechanism resulting in opening of said safety switch, and a combustion-responsive thermostat in circuit with and controlling said second time-actuated switching mechanism.

7. In a burner control system, the combination of a time train, a refueling switch, an actuator for the switch continuously driven by said time train through a one-way engagement therewith, a burner control relay including an operator and interlocking means associated with said actuator and said operator and adapted to engage and reposition said actuator to initial position when said operator is moving in a direction to stop the burner, whereby refueling operation will be delayed for a period uniformly measured from the close of the previous burner operation.

8. In a burner control system, a burner, an operator for said burner, means including a continuously operating resettable timer for recurrently energizing said operator to cause operation of said burner, means for returning said operator to initial position when deenergized, thereby interrupting operation of said burner, coupling means between said operator and said timer whereby upon deenergization of said operator and return thereof to initial position said timer will be reset to its initial position to commence a new time cycle simultaneously with each stoppage of the burner.

9. In combination, a burner-control relay, a control switch in circuit with and controlling said relay, a normally open refueling switch and a normally closed combustion-responsive switch in circuit with and conjointly controlling said relay whereby refueling operations are initiated by the closing of said refueling switch and terminated by the subsequent opening of said combustion-responsive switch, said refueling switch including an actuator associated with and adapted to be reset by said relay following each burner operation, and means for selectively establishing a definite time limit for refueling operations including means for adjusting the actuator for closing said refueling switch for periods of predetermined duration adjustable over a range of more than to less than the normal time required to operate said combustion responsive switch.

CHARLES C. CRAM.